United States Patent [19]

Rau

[11] Patent Number: 4,510,968
[45] Date of Patent: Apr. 16, 1985

[54] SUCTION DEVICE

[75] Inventor: Karl Rau, Mühlheim, Fed. Rep. of Germany

[73] Assignee: VDO Adolf Schindling AG, Frankfurt am Main, Fed. Rep. of Germany

[21] Appl. No.: 467,416

[22] Filed: Feb. 17, 1983

[30] Foreign Application Priority Data

Feb. 25, 1982 [DE] Fed. Rep. of Germany ....... 3206721
Jul. 27, 1982 [DE] Fed. Rep. of Germany ....... 3227929

[51] Int. Cl.³ .......................... F03B 11/00; F17D 1/00
[52] U.S. Cl. .................................... 137/590; 137/550; 285/226
[58] Field of Search ............... 137/577, 590, 565, 550; 285/226

[56] References Cited

U.S. PATENT DOCUMENTS

| 151,382 | 5/1874 | Grant | 137/550 |
| 2,118,681 | 5/1938 | MacDonald | 285/226 |
| 3,017,898 | 1/1962 | Hobson | 137/590 |
| 3,355,190 | 11/1967 | Francis | 285/226 |
| 4,114,784 | 9/1978 | Wempe et al. | 137/590 |

Primary Examiner—A. Michael Chambers
Attorney, Agent, or Firm—Martin A. Farber

[57] ABSTRACT

A suction device for a fuel feed unit in which the suction device has a rigid suction tube on which a suction head is arranged. The suction head is formed as a conically widening elastic bellows having a large suction opening which faces the bottom with a screen arranged in the opening. As a result of the development as an elastic bellows, the suction opening is held resting with initial spring tension (i.e., resilient prestress biasing) against the bottom of the fuel tank.

17 Claims, 3 Drawing Figures

SUCTION DEVICE

The present invention relates to a suction device for a fuel feed unit having a rigid suction tube on which there is arranged a suction head whose suction opening, which is provided with a screen, is held under spring biasing (initial spring tension) against the bottom of a fuel tank.

One such known suction device (FIG. 3) has a suction head which is provided with a guide tube and is displaceable together with the latter on the suction tube. The end facing the bottom of the fuel container is radially widened and bears the screen. The suction head is held applied against the bottom of the fuel tank by a spring.

This development has the disadvantages that it has many individual parts which make the suction device expensive and result in an increased expense for assembly.

The object of the present invention is, therefore, to provide a suction device of the type described in the introductory paragraph which comprises only a few parts and can be assembled at only slight expense.

This object is achieved in accordance with the invention in the manner that the suction head (3) is developed as a conically widening elastic bellows (4) at or within whose large suction opening (5), which faces the bottom (1), the screen (6) is arranged. As a result of the conical development of the suction head it is possible to do away with guide elements without the bellows buckling. At the same time, however, the plane of the suction opening can be completely adapted to a change in the plane of the bottom of the fuel tank. This is important since this generally thin bottom curves to a greater or lesser extent depending on the amount of fuel in the fuel tank. This adaptation of the suction opening to the bottom assures essentially complete drawing-in of fuel by the fuel feed unit. By this automatic optimal adaptation it is possible to dispense with any adaptation work when mounting the suction device. These advantages are obtained with, at the same time, an extremely simple construction of the suction device.

If the bellows (4) is of undulated contour, the resistance to buckling is particularly great. In particular, there is no bending at the acute-angle connecting points between every two flanks of the bellows but, rather, a bending which extends over all of the undulations of the undulated contour of the bellows. Accordingly, despite high flexibility, it is possible to achieve a relatively high elastic clamping of the bellows.

For simplicity in mounting, the small-diameter end of the bellows (4) can be joined onto the suction tube (2), and the bellows (4), in order to secure it, can be clamped onto the suction tube by a pipe clamp (7) which surrounds the small-diameter end of the bellows.

The bellows (4) can be produced simply and economically as an injection molding part.

In order to assure an unimpeded flow of fuel into the suction opening, spacers which project towards the bottom of the fuel tank can be arranged on the bellows (4). These spacers can be provided in simple manner if the spacers are knobs or nubs formed on the bellows (4).

Simplicity in mounting is obtained if the screen (6) is rigid at least in its radially circumferential edge region and can be joined into the bellows (4). In this case, the spacers (10) which project towards the bottom of the fuel tank can be formed on the screen (6).

Assembly is greatly simplified if the inner wall of the suction opening (5) of the bellows (4) is approximately cylindrical and developed with a radially outwardly directed annular groove (8) into which the radially outwardly directed rim (9) of the screen (6) can be joined. In this case, the spacers (10) may extend radially outward further than the inside diameter of the suction opening (5) of the bellows (4) does so that they serve at the same time as a stop which limits the depth of insertion upon the mounting of the screen.

The screen (6) can be economically produced if it is an injection molding part.

In accordance with another advantageous development of the invention, the bellows (4) may consist of a material which increases its volume in fuel and be surrounded at the rim (12) of the mouth of its suction opening (5) by a radially circumferential rigid rim (14) of the screen (6) which consists of a material which is dimensionally stable in fuel. In this case, the bellows (4) preferably consists of a plastic which swells in fuel. Due to this, the bellows and screen can be so designed that, for assembly the bellows can be easily introduced into the surrounding rigid rim of the screen. If the suction device is then introduced into the fuel tank, which is full of fuel, the material of the bellows swells a given amount, as a result of which its radial diameter increases and the rim of its mouth is thereby clamped radially against the radially circumferential rigid rim of the screen. In this way, despite easy assembly, the screen is held in absolutely dependable manner against the bellows in the final state of installation. Easy insertion of the bellows and screen into each other can be obtained in the manner that the circumferential rim (14) of the screen (6) is cylindrical and that the rim (12) of the mouth of the bellows (4), which is also cylindrical, has its radially outward cylindrical surface resting against the radially inward cylindrical surface of the rim (14).

If the front end (16) of the rim (12) of the mouth of the bellows (4) can be introduced into the circumferential rim (14) of the screen (6) until it comes to rest against a radially inwardly projecting stop (17) on the screen (6), then no special mounting devices are necessary to determine the correct installed position of the bellows in the screen.

In order to avoid the possibility of the screen detaching itself from the bellows before the suction device is introduced into the fuel tank, the rim (12) of the mouth of the bellows (4) can be adapted to be joined into the circumferential rim (14) of the screen (6). For this purpose, a radially inwardly projecting stop (15) is preferably provided on the circumferential rim (14) of the screen (6), said stop extending into a corresponding recess in the bellows (4). Of course, a plurality of circumferentially distributed stops can also be provided. In order that a stop need not be associated with a given recess, with the expense resulting therefrom, the recess may be a radially inwardly directed circumferential groove (13).

A simple mounting of the suction tube on the bellows can be obtained in the manner that the suction tube (2) can be inserted into the tube end of the bellows (4) facing away from the suction opening (5) until it comes to rest against a radially inwardly directed stop (11). In this way special mounting devices which fix the depth of insertion of the suction tube into the bellows can be dispensed with in simple fashion. For this purpose, the stop (11) is preferably developed radially circumferentially on the inner wall of the tube portion of the bellows (4).

With the above and other objects and advantages in view, the present invention will become more clearly understood in connection with the detailed description of preferred embodiments when considered with the accompanying drawings, of which:

Figure 1:
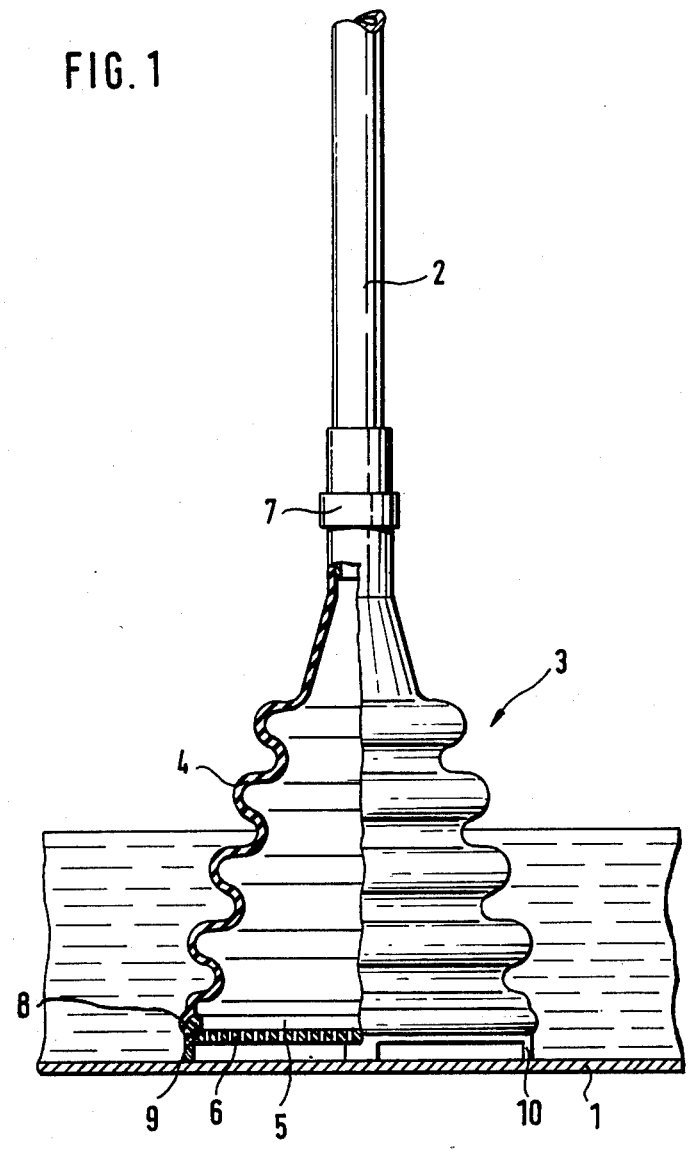
FIG. 1 is a half-sectional view of a suction device in accordance with the invention.

The suction devices shown in the figures are arranged on a fuel tank of an automotive vehicle, only a portion of the bottom 1 of the fuel tank being shown.

The suction device is made of a rigid suction tube 2 which is arranged fixed in position in the fuel tank and of a suction head 3 fastened thereto. The suction head 3 is developed as an elastic bellows 4 made of a plastic injection molding which widens in conical shape towards the bottom 1 and on whose suction opening 5, which faces the bottom 1, a screen 6 is arranged.

In FIG. 1, the tube end of the bellows 4 facing away from the bottom 1 is pushed over the bottom end of the suction tube 2 and held fast in non-displaceable manner on the suction tube by a pipe clamp 7.

Within the region of the suction opening 5, the bellows 4 is cylindrical and has a radially circumferential annular groove 8 in the inner wall of its cylindrical part. Within the annular groove 8 there is engaged a corresponding radially circumferential rim 9 of the screen 6, which is developed as a rigid injection molding of plastic. The screen 6 furthermore has spacers 10 which project towards the bottom 1 and which hold the suction opening 5 at all times at a predetermined small distance from the bottom 1.

The spacers 10 extend further radially outward than the diameter of the suction opening 5. As a result, they form at the same time stops which limit the depth of insertion of the screen 6 into the suction opening 5.

By its tube end which faces away from the bottom 1 the bellows 4 is pushed over the bottom end of the suction tube 2 until the suction tube 2 comes to rest on a radially inwardly directed stop 11 of the bellows 4, the bellows being braced or clamped fast against displacement on the suction tube 2 by a pipe clamp 7.

In the region of the suction opening 5, the bellows 4 is developed cylindrically at the rim 12 of its mouth. This cylindrical rim 12 adjoins a radially circumferential groove 13 of the bellows 4. The mouth rim 12 is surrounded by a radially circumferential rigid rim 14 of the screen 6 which consists of a material which is dimensionally stable in fuel.

On the end of the rim 14 facing the suction head 3, four stops 15 which are distributed uniformly over the circumference extend radially inward into the groove 13. The axial length of the mouth rim 12 from the groove 13 to its front end 16 corresponds in this connection to the distance between the stops 15 and a radially inwardly directed stop 17 formed by the screen 6. In this way, the mouth rim 12 can be inserted in simple manner into the rim 14 until the front end 16 rests against the stop 17, the stops 15 in this inserted position then engaging into the groove 13 and thus holding the screen 6 fast on the bellows 4.

If the assembled suction head 3 is now introduced into a fuel tank which is full of fuel, the material of the bellows swells so that the outside diameter of the mouth rim 12, inter alia, expands. Since the rim 14 of the screen 6, however, does not change shape, the mouth rim 12 clamps itself in the manner of a press-fit within the rim 14, whereby a dependable fastening of the screen 6 to the bellows 4 is obtained.

The screen 6 furthermore has spacers 10 which project towards the bottom and hold the suction opening 5 at all times at a predetermined slight distance from the bottom 1.

Figure 2:
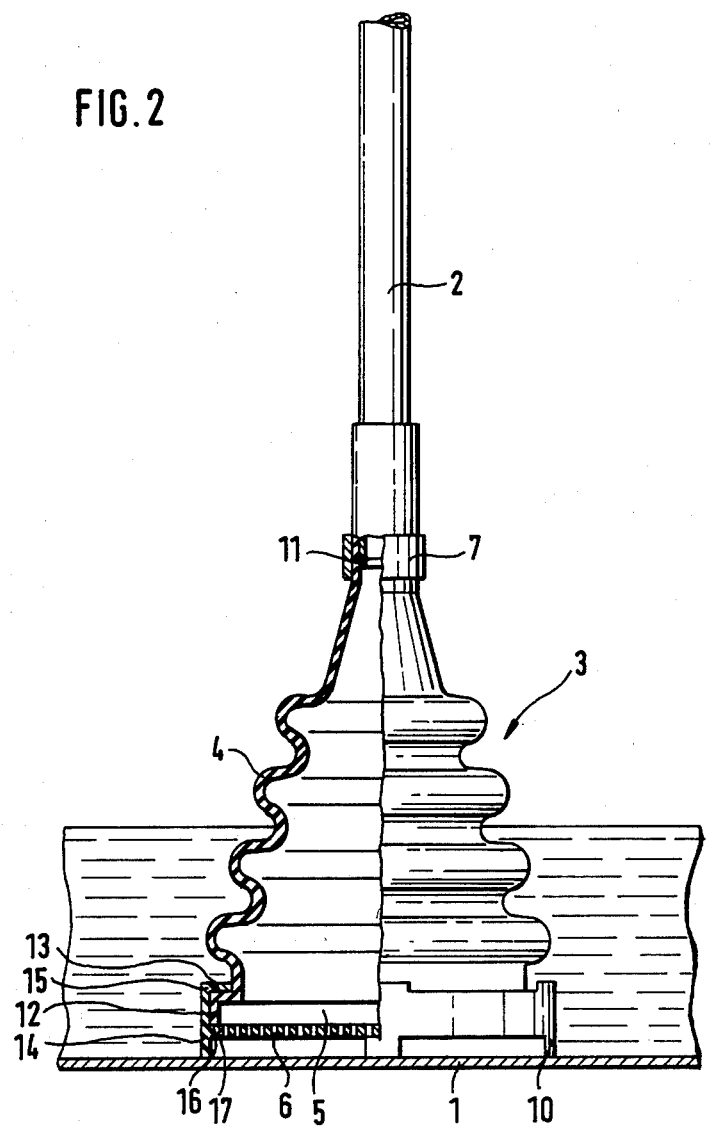
FIG. 2 is a second embodiment of a suction device in accordance with the invention, also shown in half section.
Figure 3:
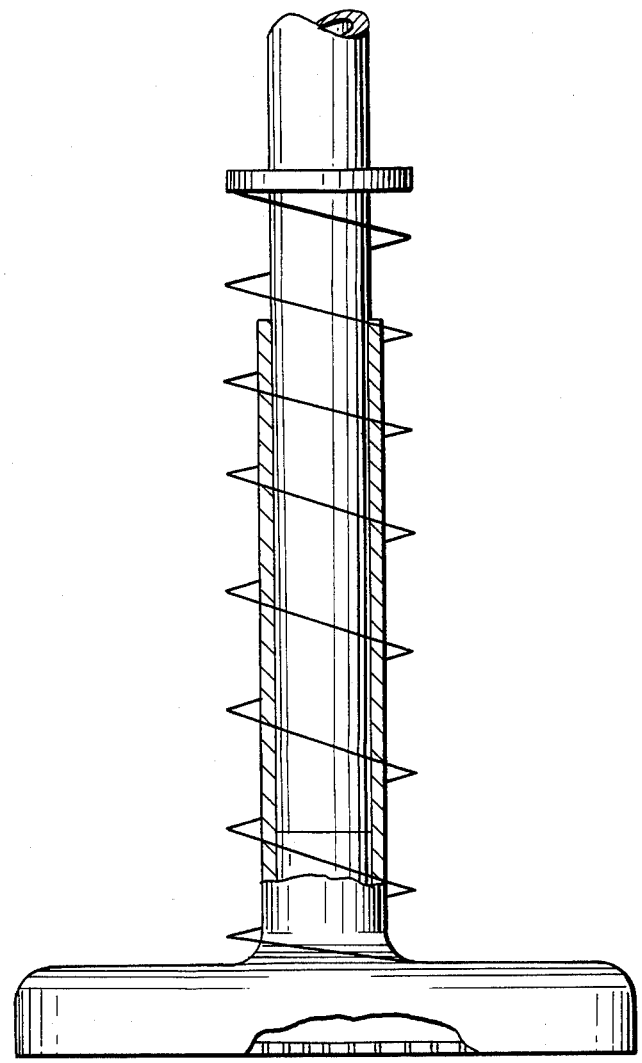
FIG. 3 is an elevational view partly broken-away and in longitudinal section of the prior art.

In the embodiments shown in FIG. 1 and FIG. 2, the bellows 4 has an undulated contour which results in high elasticity, particularly in axial direction, and thus produces the initial spring tension by which the suction head 3 is held against the bottom 1. Due to the undulated development of the bellows 4, upon the compression of the bellows there is a bending of the bellows wall rather than a buckling so that high resistance to buckling of the bellows is present.

An example of the material of the bellows which increases its volume in fuel is known under the name "Hydrel" of Du Pont. The material of the rim 14 which does not change shape may be Acetalhomopolymerisath.

The above embodiments are given by example only and not in a limiting sense.

I claim:

1. In a suction device for a fuel feed unit in a fuel tank, the suction device having a rigid suction tube, on which tube there is arranged a suction head, the latter being formed with a suction opening provided with a screen and being held under resilient pretension against a bottom of the fuel tank, the improvement wherein
said suction head comprises a conically widening elastic bellows having its large said suction opening facing the bottom,
said screen is arranged at said suction opening,
said screen has a rigid radially directed circumferential edge region snapable into the bellows,
said bellows has an inner wall defining the suction opening of the bellows, and
said inner wall is approximately cylindrical and has a radially directed annular groove, said radially directed circumferential edge region of the screen is joinable into said radially directed annular groove.

2. In a suction device for a fuel feed unit in a fuel tank, the suction device having a rigid suction tube, on which tube there is arranged a suction head, the latter being formed with a suction opening provided with a screen and being held under resilient pretension against a bottom of the fuel tank, the improvement wherein
said suction head comprises a conically widening elastic bellows having its large said suction opening facing the bottom,
said screen is arranged in said suction opening,
said bellows is made of a material which increases its volume in fuel,
said bellows has a rim defining a mouth of said suction opening,
said screen has a circumferential rigid rim which is made of a material which is dimensionally stable in fuel, and
said rigid rim of said screen surrounds said rim of said bellows.

3. The suction device according to claim 2, wherein said bellows is made of a plastic which swells in fuel.

4. The suction device according to claim 2, wherein said rigid rim of the screen is cylindrical,
said rim of the mouth of said bellows is cylindrical and abuts with its radially outward circumferential surface against the radially inward circumferential surface of said rigid rim.

5. The suction device according to claim 4, wherein said screen forms a stop extending radially inwardly from said rigid rim,
a front end of said rim of said mouth of said bellows is insertable into said rigid rim of said screen until said front end abuts against said stop of said screen.

6. The suction device according to claim 2, wherein said rim of the mouth of the bellows is joinable into the rigid rim of the screen.

7. The suction device according to claim 6, wherein said bellows is made of a plastic which swells in fuel.

8. The suction device according to claim 6, wherein said rigid rim of the screen is cylindrical,
said rim of the mouth of said bellows is cylindrical and abuts with its radially outward circumferential surface against the radially inward circumferential surface of said rigid rim.

9. The suction device according to claim 8, wherein said screen forms a stop extending radially inwardly from said rigid rim,
a front end of said rim of said mouth of said bellows is insertable into said rigid rim of said screen until said front end abuts against said stop of said screen.

10. The suction device according to claim 6, further comprising
said bellows has a tubular shaped end which faces away from the suction opening, said tubular shaped end has a radially inwardly directed stop,
said suction tube is insertable into the tubular shaped end of the bellows until said suction tube abuts against said radially inwardly directed stop.

11. The suction device according to claim 10, wherein
said stop is formed on an inner surface of the wall of the tubular shaped end of the bellows and extends radially inwardly and at least partly circumferentially.

12. The suction device according to claim 6, wherein said circumferential rigid rim of said screen has a radially inwardly projecting stop,
said bellows is formed with a recess corresponding to said stop,
said stop extends into said recess.

13. The suction device according to claim 12, wherein
said recess is a radially directed circumferential groove in said bellows.

14. The suction device according to claim 2, further comprising
said bellows has a tubular shaped end which faces away from the suction opening, said tubular shaped end has a radially inwardly directed stop,
said suction tube is insertable into the tubular shaped end of the bellows until said suction tube abuts against said radially inwardly directed stop.

15. The suction device according to claim 14, wherein
said stop is formed on an inner surface of the wall of the tubular shaped end of the bellows and extends radially inwardly and at least partly circumferentially.

16. In a suction device for a fuel feed unit in a fuel tank, the suction device having a rigid suction tube, on which tube there is arranged a suction head, the latter being formed with a suction opening provided with a screen and being held under resilient pretension against a bottom of the fuel tank, the improvement wherein
said suction head comprises a conically widening elastic bellows having its large said suction opening facing the bottom, and
said screen is arranged in said suction opening.

17. In a suction device for a fuel feed unit in a fuel tank, the suction device having a rigid suction tube, on which tube there is arranged a suction head, the latter being formed with a suction opening provided with a screen and being held under resilient pretension against a bottom of the fuel tank, the improvement wherein
said suction head comprises a conically widening elastic bellows having its large said suction opening facing the bottom,
said screen is arranged in said suction opening,
said bellows has a rim defining a mouth of said suction opening,
said screen has a circumferential rigid rim, and
said rigid rim of said screen surrounds said rim of said bellows, and
said rim of the mouth of the bellows is joinable into the rigid rim of the screen.

* * * * *